April 16, 1929.　　C. L. LEE ET AL　　1,709,317

CASTING APPARATUS

Filed April 22, 1925　　6 Sheets-Sheet 1

Fig. 1.

Inventor
Charles L. Lee and
Thomas C. Van Degrift,
By Spencer Sewall & Hardman
his Attorneys.

April 16, 1929.　　C. L. LEE ET AL　　1,709,317
CASTING APPARATUS
Filed April 22, 1925　　6 Sheets-Sheet 4

Inventor
Charles L. Lee and
Thomas C. Van Degrift
By Spencer Sewall & Hardman
his Attorneys

April 16, 1929. C. L. LEE ET AL 1,709,317
CASTING APPARATUS
Filed April 22, 1925   6 Sheets-Sheet 6

Inventor
Charles L. Lee and
Thomas C. Van Degrift
By Spencer Sewall & Hardman
his Attorneys

Patented Apr. 16, 1929.

1,709,317

UNITED STATES PATENT OFFICE.

CHARLES L. LEE AND THOMAS C. VAN DEGRIFT, OF DAYTON, OHIO, ASSIGNORS TO GENERAL MOTORS RESEARCH CORPORATION, OF DAYTON, OHIO, A CORPORATION OF DELAWARE.

CASTING APPARATUS.

Application filed April 22, 1925. Serial No. 24,968.

This invention relates to the art of metal founding and particularly to casting metals in metallic or other permanent molds.

Among the objects to be achieved are: convenient operation of the molds in closing and opening; automatic locking of the molds by the act of closing; parallel and straight-line movements of the molds during final closing and initial opening; providing a wide unobstructed space between the molds when they are wide open to afford unhampered access to the parts between them; quick and easy attachment or detachment of the molds with respect to their carriers; ejection of the casting by the act of opening the molds; compensation for expansion of the casting in setting; quick and accurate centering of cores with respect to the molds; proper ventilation to permit escape of gases emanating from the core; and in general to facilitate the production of castings of high quality in permanent molds.

The invention consists in the combinations, sub-combinations and details of construction hereinafter described, illustrated in the drawings and defined in the appended claims.

In the drawings in which like parts are indicated by like reference characters throughout the several views.

Figure 2:
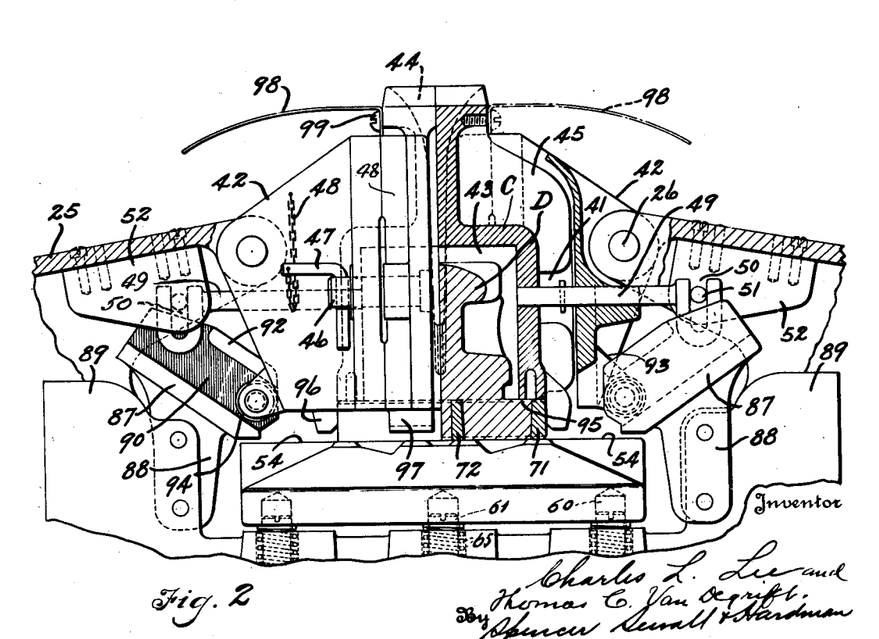
Fig. 2 is a fragmentary view, partly in side elevation and partly in section, of the mid-portion of the apparatus, the mold sections being closed and a core in place on the core platform.
Figure 4:
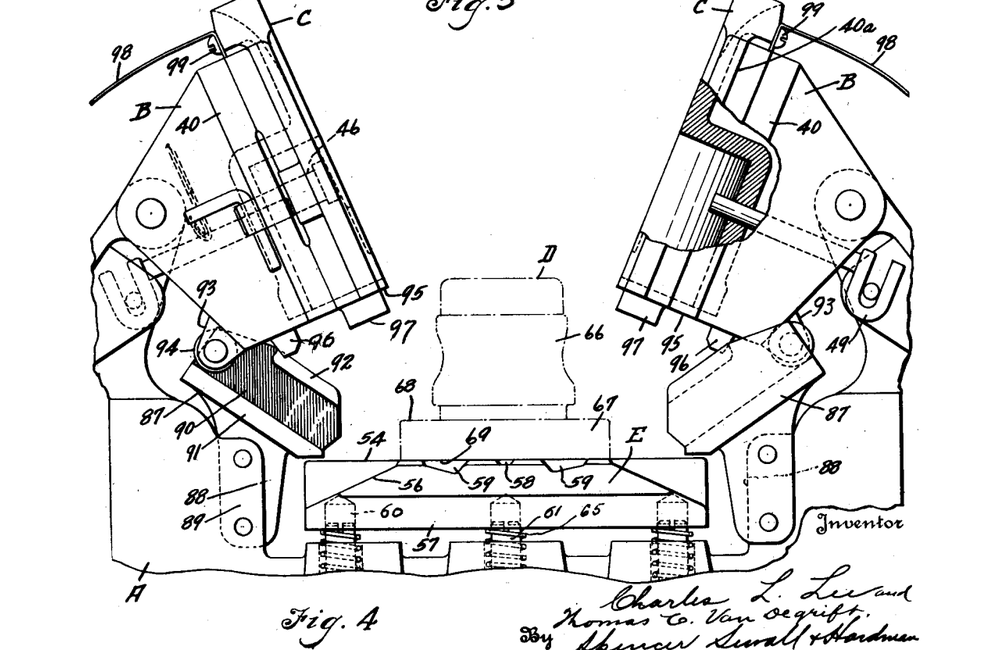
Fig. 4 is a fragmentary view, partly in side elevation and partly in section, showing the mold sections open and a core, in dotted-lines, on the core platform.

In the illustrated embodiment of the invention, A indicates the base of a casting apparatus to which are attached the molds, mold carriers, operating mechanism therefor, and a yielding core platform. B indicates carriers to which may be detachably secured mold sections C. When the mold sections C with their carriers are closed in position to receive molten metal, they are disposed substantially centrally above the base and above a platform indicated by the letter E, which is preferably mounted on springs so as to yield downward. The platform E may have a surface adapted to contact with the metal of the casting and form of itself, a section of a mold, or it may support on its surface a part of a mold, and the yielding of this part owing to the expansion of the casting avoids the necessity of providing means to let the mold sections C yield laterally under such conditions. In Figs. 2 and 4, a core D is shown in place on the platform E, said core having a flange-like core base which closes the lower open ends of the sections C, shown in the drawings as sections of a piston mold, although obviously the sections may be formed so as to cast other objects than pistons.

Figure 1:
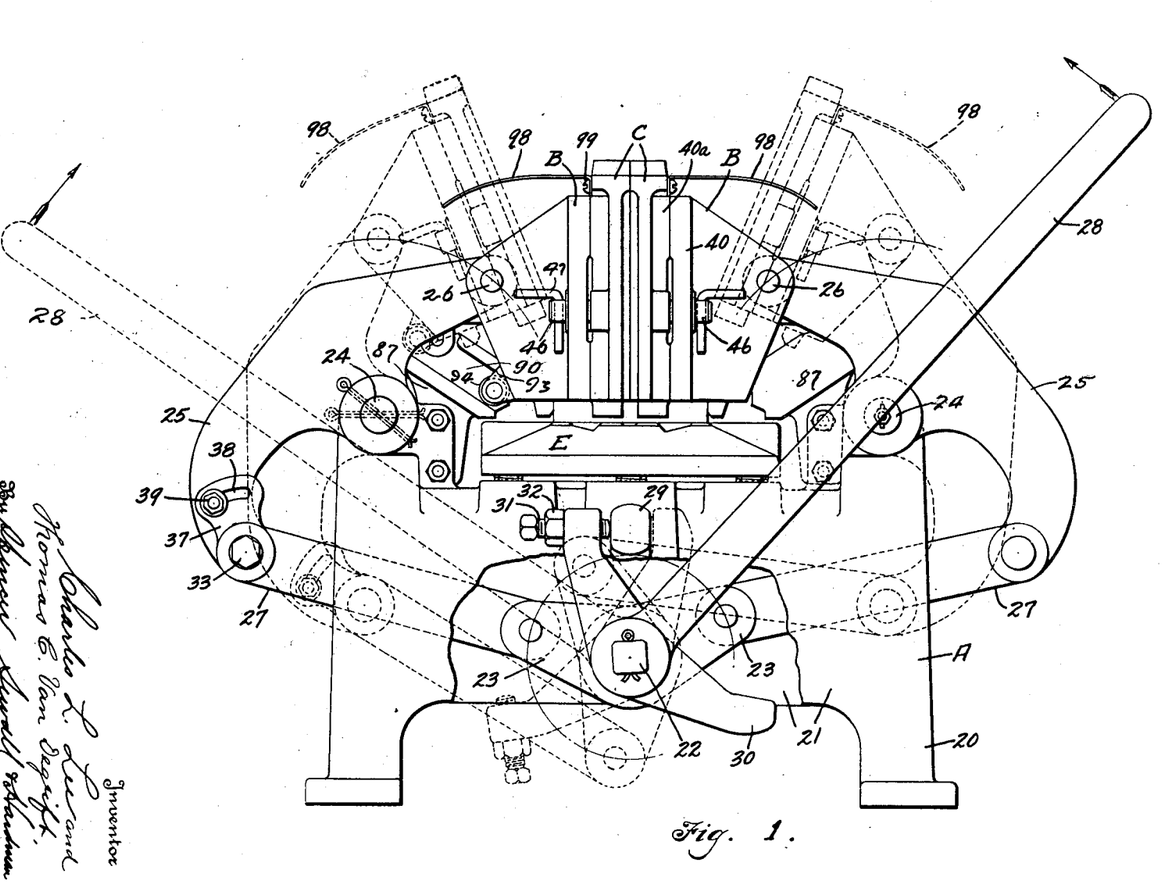
Fig. 1 is a side elevation of the apparatus constituting the subject of this application, showing by full-lines the mold sections in closed position and by broken-lines the mold sections in open position.
Figure 13:
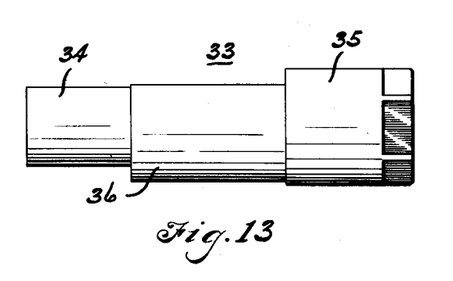
Figs. 13, 14 and 15 are, respectively, a side elevation and opposite end views of an adjusting eccentric disposed in the linkage between a mold carrier lever and the main operating lever.
Figure 14:
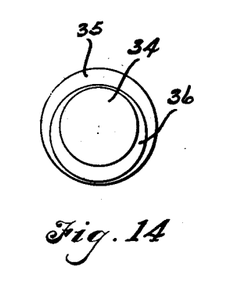
Figure 15:
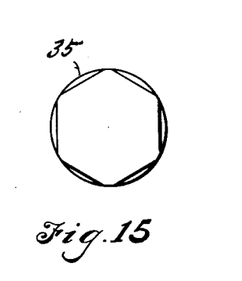

The base A may consist of a hollow casting provided with four supporting legs 20, a top and side walls 21. In Fig. 1, one of said side walls 21 has been shown broken away in part to expose mechanism housed within the base by means of which the mold carriers may be moved to open or closed position. Passing through two opposed walls 21 and journaled in them, is a rock shaft 22, the axis of which lies substantially in the same perpendicular plane as the meeting faces of mold sections C. Arms 23 are connected with the rock shaft 22, in such manner that they are compelled to partake of all rocking movements of said rock shaft. Fulcrumed on the base A, as at 24, are mold-section-carrier levers 25, to the upper end of each of which is pivoted, as at 26, a mold carrier B. Links 27 connect the lower or power ends of the respective levers 25 to said arms 23, and hand lever 28 is secured to one end of rock shaft 22, so that movement of the hand lever rocks said shaft. In order to limit the extent of rocking motion of the shaft 22, there are provided on the base A, a stop 29, and on the rock shaft 22, a pair of arms 30, the opposite ends of which are adapted to engage opposite faces of said stop 29. One of the arms 30 may have an adjustable set screw 31 threaded in it, in order to limit the extent of the rocking movement of said shaft 22, and this set screw 31 may be adjusted and locked in adjusted position by a lock nut 32. In this manner the extent of movement of the operating mechanism may be adjusted so that the engaging faces of the mold sections may be brought into contact as desired. A further adjustment is provided in the connection between one of the links 27 and one of the levers 25. In Fig. 1, this adjustment is shown at the left. It consists of a pivot pin 33, shown in detail in Figs. 13, 14 and 15, which has concentric ends 34 and 35 and an intermediate eccentric portion 36. The levers 25 are preferably channel-shaped in cross-section, thereby providing two side walls in one of which the end 34 of pin 33 engages, while the larger end 35 is fitted within the other side wall of said lever. The eccentric portion 36 constitutes the pivot of the outer end of link 27. In order to adjust the pin 33 so as to change the position of the lever slightly with respect to the rock shaft and link, there is secured nonrotatably to said pin an arm 37, which is provided with an arcuate slot 38. Through the slot extends a clamping bolt 39 screwed into a suitable threaded opening in the lever 25. By loosening the bolt 39 and rocking the arm 37 it will be apparent that an adjustment of the described connection can be obtained.

Each mold-section carrier B is formed at opposite sides with flanges 40. Between these flanges the mold carrier is hollowed out so as to provide a channel 41 from top to bottom. The carrier also has rearward projections 42, both of which are perforated to receive the pintle 26 forming part of the pivotal connection of the mold-carrier-lever to the mold carrier.

Mold sections C comprise two mating members. In the illustration these members form two sections of a piston mold, which when brought together provide a cylindrical mold chamber 43, for the body of the piston, and a gate and runner 44 for receiving molten metal and conducting it to the chamber 43. The gate 44, in the form shown, is at one side of the chamber 43 and is so formed as to conduct the molten metal into the lower part of the chamber. Each mold section is preferably provided with radiating fins 45 adjacent the gate and also adjacent the molding chamber 43. These fins may be formed integral with the molds or be attached thereto in any suitable manner. The body of the mold and the radiating fins 45 adjacent the mold chamber, project into the channel 41 formed in the mold carrier. The radiating fins arranged as described, and the channel 41, provide for efficient conducting away of the heat from the mold by currents of air moving around the molds and rising through said channel. Each mold has, on each side of its body, flanges or lateral extensions 40ª, adapted to fit against the flanges 40 of the mold carriers and the flanges 40 and mold extensions 40ª are provided with registering countersunk holes designed for receiving pins 46 in order to secure the mold sections to the carriers. The meeting faces of said flanges 40 and the mold extensions 40ª may be machined carefully in order to obtain accurate positioning of the molds with respect to each other and to the carriers. In order to secure the mold sections to the carriers, so that said mold sections may be quickly attached or detached therefrom, the pins 46 are made smooth and adapted to fit in the holes through said flanges and mold parts and be held in place by slip keys or pins 47, which may be readily lifted and the pins 46 knocked out. The pins 46 are headed and the heads fit in the counterbores formed in the faces of the extensions 40ª of said mold sections. It is preferable to attach the locking pins 47 to the carriers by means of a small chain or other strand 48 so that said pins will always be at hand in case of need.

Figure 3:
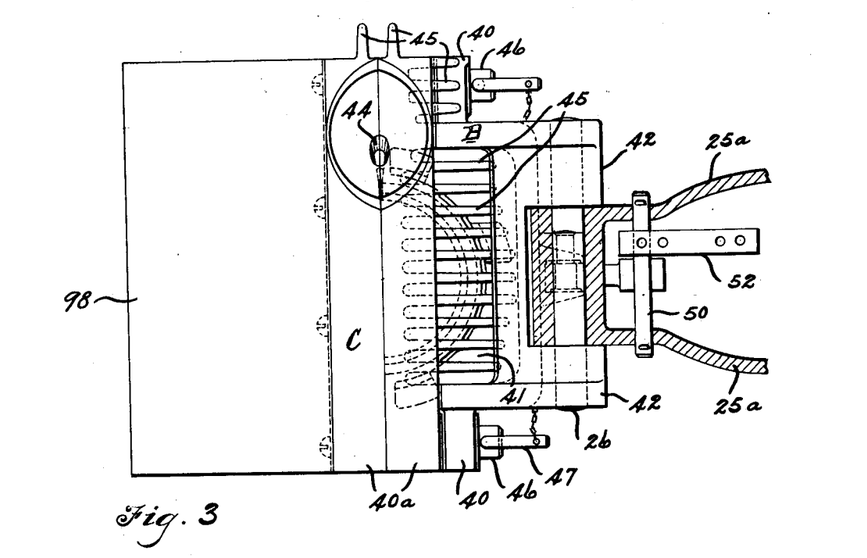
Fig. 3 is a fragmentary view of a portion of the apparatus seen from above, partly in section, the mold sections being closed and one of the spatter shields removed.

For the purpose of ejecting a casting from a mold section when the mold is opened, ejector pins 49 are slidably mounted in registering holes formed in the mold carriers and in the mold sections. The ejector pins 49 may be actuated by engagement with parts fixed to levers 25 when the molds are opened. In the form shown, the inner ends of the pins are flush with the interior surface of the molds when the molds are closed, but when the molds are opened, the relative angular movement between the mold carriers and the mold-carrier levers forces the ejector pins inward and detaches the casting from whichever mold section it may adhere to. In the form shown, each ejector pin 49 has a transverse, open-ended slot or way 50 at its outer end, which is engaged by a pin 51 carried on lever arm 25. As the space between the side members of lever arm 25 is rather wide the pin 50 is, in the form shown in Figs. 2 and 3, passed through both the side members 25ᵃ of the lever and through a stiffening bracket 52 which is bolted to the back of the lever. That portion of the pin 51 which engages the slot or way 50 is, therefore, adjacent the bracket 52 and is stiffened by it.

Figure 16:
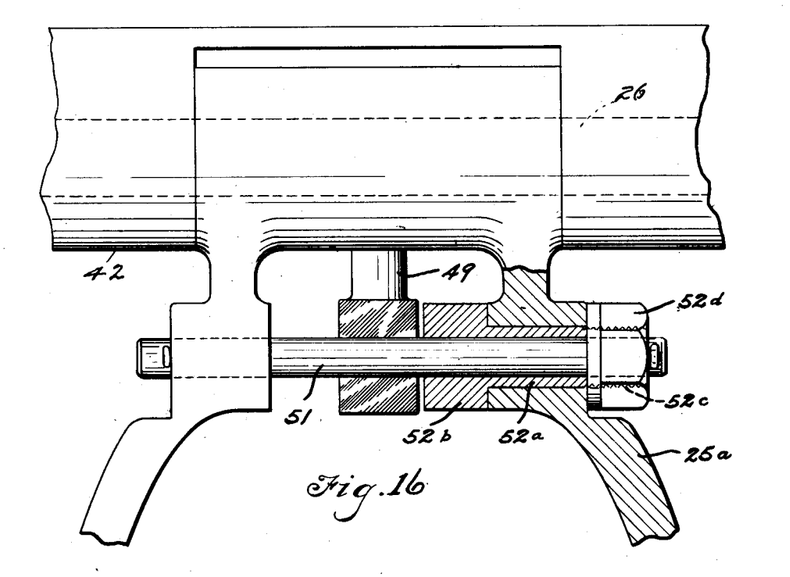
Fig. 16 is a fragmentary view showing a preferred form of ejector-operating device on one of the mold carrier levers.

An alternative and preferred form of mounting the pin 51 is shown in Fig. 16. In this form the bracket 52 is omitted and its place is taken by a hollow, stiffening member 52ᵃ, which is provided with a head 52ᵇ at one end and threads 52ᶜ at the opposite end. This hollow member 52ᵃ is passed through a hole drilled in one side member 25ᵃ of lever 25 and is locked in place by the nut 52ᵈ. The headed end 52ᵇ of this member is adjacent that portion of the pin 51 which engages the slot 50 in the ejector pin 49.

The core platform E provides means for closing the lower open end of cylinder or other open-ended mold sections when such are used. Although some utilities of the apparatus would be realized if said platform were formed with or rigidly mounted on the base A, it should be yieldingly mounted thereon in order that opportunity may be given to the casting to expand when cooling. Platform E may be a casting having the form shown in bottom plan in Fig. 7, in top plan in Fig. 5, and in edge elevation in Figs. 1, 2 and 4. The platform illustrated is designed for use in combination with a piston-casting apparatus. The upper surface of said platform has a generally circular plane surface 53 slightly elevated above the body of the platform, and plane narrow surfaces 54 extending flush with the surface 53 from opposite sides thereof to the edges of the platform. The surface 53 rises from a substantially rectangular surface 55. From the edges of said rectangular surface the platform is beveled downward as at 56 leaving relatively narrow, upright edge portions 57. The plane surface 53 is traversed by a central groove 58 which is not depressed into the surface 55, and two relatively deep grooves 59 depressed into the surface 55. These grooves provide for ventilation of the core, as will presently be explained.

In the under side of platform E four drill holes 60 are formed to serve as guide holes for pins 61 secured to the base A. The pins are screwed into threaded holes 62 formed in the base A. The holes 62 are counterbored as at 63 and the pins 61 are formed with shoulders 64 which seat on the bottom of the counterbore. Springs 65 surround the larger end of pins 61, and bear at one end on the bottom of the counterbore and at their other ends against the under side of platform E. By the means described the platform is accurately registered with the mold sections, prevented from moving in a horizontal plane but allowed to yield vertically under pressure sufficient to overcome the elastic pressure of the springs 65.

A core D for a piston mold is shown in dotted-lines in elevation in Fig. 4, resting on the platform E. This core may be a green sand core or a baked oil sand core or of other suitable material customarily used for cores. The body 66 of core D is of course a patrix the reverse in contour of the interior of the piston or other body to be cast. The body 66 is combined with a flange-like base 67, which, in the example shown, is circular and has its upper surface 68 parallel with its under surface 69, both of said surfaces being perpendicular to the axis of the core; whereby with a supporting surface or surfaces 53 trued in a plane perpendicular to the axis of the core and mold sections, the core may be readily centered with respect to said mold sections so that the casting produced will be accurate, and, in the casting of a piston for example, the walls will be of even thickness circumferentially.

Figure 11:
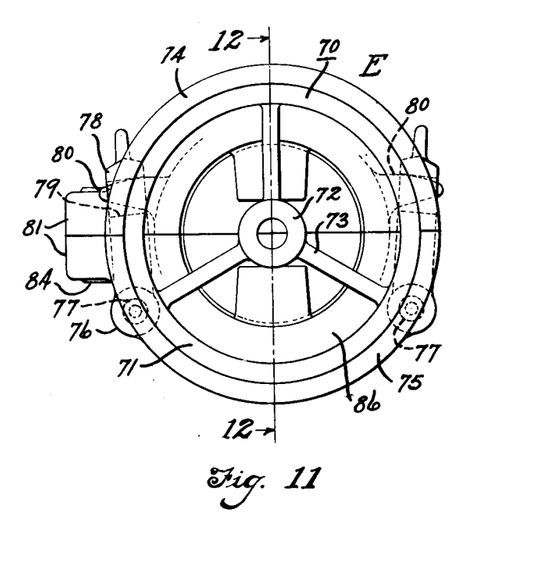
Fig. 11 is a bottom plan view of a piston core box with a metallic core-centering member in place.
Figure 12:
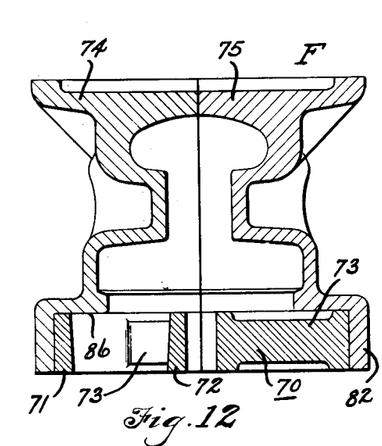
Fig. 12 is a section on line 12—12 of Fig. 11.

The core base 67 is preferably formed of metal combined with sand or other core material molded together. The metallic portion of the core base 67 may consist of a metallic centering member 70 having a rim or annular exterior 71 connected to a central perforated hub 72 by radiating spoke-like members 73 (Figs. 2, 11 and 12). The rim, hub and spoke-like members taper upward. The open spaces between rim, hub and spokes are filled with sand or other core material during the process of forming the core. The metallic centering member may have the lower and upper surfaces of hub and rim machined or otherwise trued. The spokes may be of less height than said hub and rim so as not to contact with the core base. Said centering member may be joined with the core material in a manner to be now explained.

Referring to Figs. 9, 10, 11 and 12, F represents a core box as a whole. The core box F is composed of two partible sections 74 and 75 which may be substantially similar in internal contour. One section 75 is provided with two pairs of hinge lugs 76 through which extend pintles 77 on which are pivoted locking members 78 each having a hole 79. The other section 74 is provided with locking lugs 80. Each of the core box sections has an ear 81 at one side of the base portion 82 and another ear 83 diagonally opposite the ear 81, at the upper portion of said section. The said ears 81 and 83 of each pair have perforations which register when the sections match. Pins 84 and 85 maintain correct registration. The locking members 78, when turned to locking position, engage the lugs 80, said lugs entering the openings 79 in the locking members. Lugs 80 are so formed that a camming engagement between them and the locking members draws the two sections close together and clamps them rigidly. The base portion 82 is preferably accurately bored or otherwise machined to receive the core-centering member 70, and has the surface 86 perpendicular to the axis of the core box, so that said member 70 fits neatly within said base with its upper and lower surfaces also perpendicular to the axis of the core box.

Figure 10:
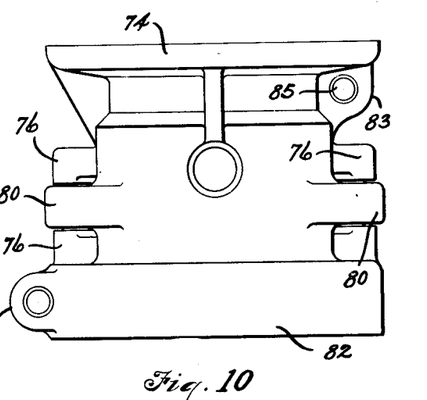
Fig. 10 is an elevation of a complete piston core box.

When the core box is to be filled with core material, the core box should be inverted from the position in which it is shown in Figs. 10 and 12 and, with the centering member 70 in place, it would appear as in Fig. 11, if looked at from above. The core box may be filled with core material which may be tamped therein until it reaches a level a little below the surface 86. Then the centering member 70 may be inserted, care being taken to have the surface 86 perfectly free from sand or other particles and the member 70 likewise quite clean so that the base surface of the centering ring will be accurately positioned with respect to the axis of the core box. Sand or other core material may then be tamped into the core box through the openings between the rim, spokes and hub of the member 70 until said material is packed solidly to a plane flush with the exposed surface of said centering member.

Reverting now to the mold carriers B and means for operating them: The carriers B are pivoted to the carrier levers 25 as previously described. In order that the carriers B may be caused to open wide for ready access to the core platform and tilt to such an angle as to make the insides of the mold sections readily accessible for sooting or otherwise coating, members having camways are connected to the base A which cooperate with lugs on the carriers B, said lugs and camways being so disposed as to control the angular position of the carriers during their movements to and from closed position. The said cams are formed in members 87 having depending arms 88 bolted or riveted to bracket member 89 formed on the base. In one side of each cam member 87 is an inclined cam groove 90, lying between a lower guide wall 91 and a shorter upper guide wall 92. A lug 93 on each carrier B supports a side pin preferably having a roller 94 guided in the groove 90. When the mold carriers are wide open, as shown in Fig. 4, the carriers may be tilted back still further about the pivots 26, as the guide wall 92 does not extend above the roller 94 when the carriers are fully separated. The design of the cam groove is also such as to cause the faces of the mold sections on the carriers to approach with their faces in parallel and the pivotal connection of the carriers with the levers 25 allows the faces of the molds to adjust themselves perfectly. The roller 94 may have a slight play in the cam groove. As before stated, the relative angle of the cam groove 90 and arcs of movement of pivot 26 and of carrier B are such as to cause a parallel movement of the mold faces in the final closing and initial opening stages. For convenience of manufacture, the cam members for each mold carrier are identical and are consequently reversed in position with respect to each other when mounted on the apparatus.

Considering again the construction of the mold sections C: Each mold section has a lower end constituting a ledge 95 which is preferably machined plane, and, in the piston mold shown, perpendicular to the axis of said sections. Outside of and depending below the ledge 95 are centering lugs 96 and 97. Each lug 96 is disposed on a mold section directly over a surface 54, while the lugs 97 are near the edges of the section. In a piston or like mold the inner faces of the lugs are substantially coincident with a circle of the same diameter as the centering member 70 of the core. The lugs are intended to engage the outside of rim 71 of centering member 70, as the molds are moved to closed position and center the core with respect to the mold sections. The ledge 95 closes down on top of the rim 71 and insures that the core is clamped to the top surface 53 of the base snugly and accurately. By this means the core is sure to be centered accurately so that the walls of the piston cast in the mold will be of even thickness. The upper surface 68 of the core base 67 constitutes with the core a part of the complete mold. When the metal cast in the mold expands on cooling, pressure on the surface 68 and on the core may cause the core platform to yield sufficiently to take care of expansion. The relation of the pivots connecting the links 27 with levers 25 and arms 23 to the axis of shaft 22 are such as to form a toggle, the members of which are so related that when the mold sections are closed the links 27 are approximately in line with the arms 23 and consequently lock the mold sections closed, as indicated in full-lines in Fig. 1. Moving the hand lever 28 toward dotted-line position quickly breaks the toggle brace of said links and arms.

To prevent molten metal spilled from a ladle or overflowing from the gate 44, from falling or spattering into the joints of the apparatus, sheet metal shields 98 are bolted to the molds by machine bolts 99.

Figure 5:
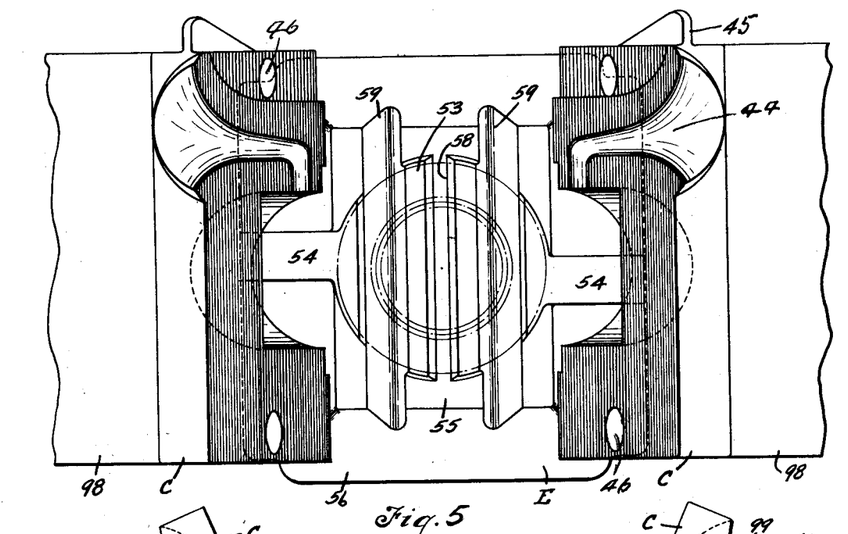
Fig. 5 is a view from above, disclosing the mold sections in open position and, in dotted lines, a core upon the core platform.
Figures 6, 7, 8:
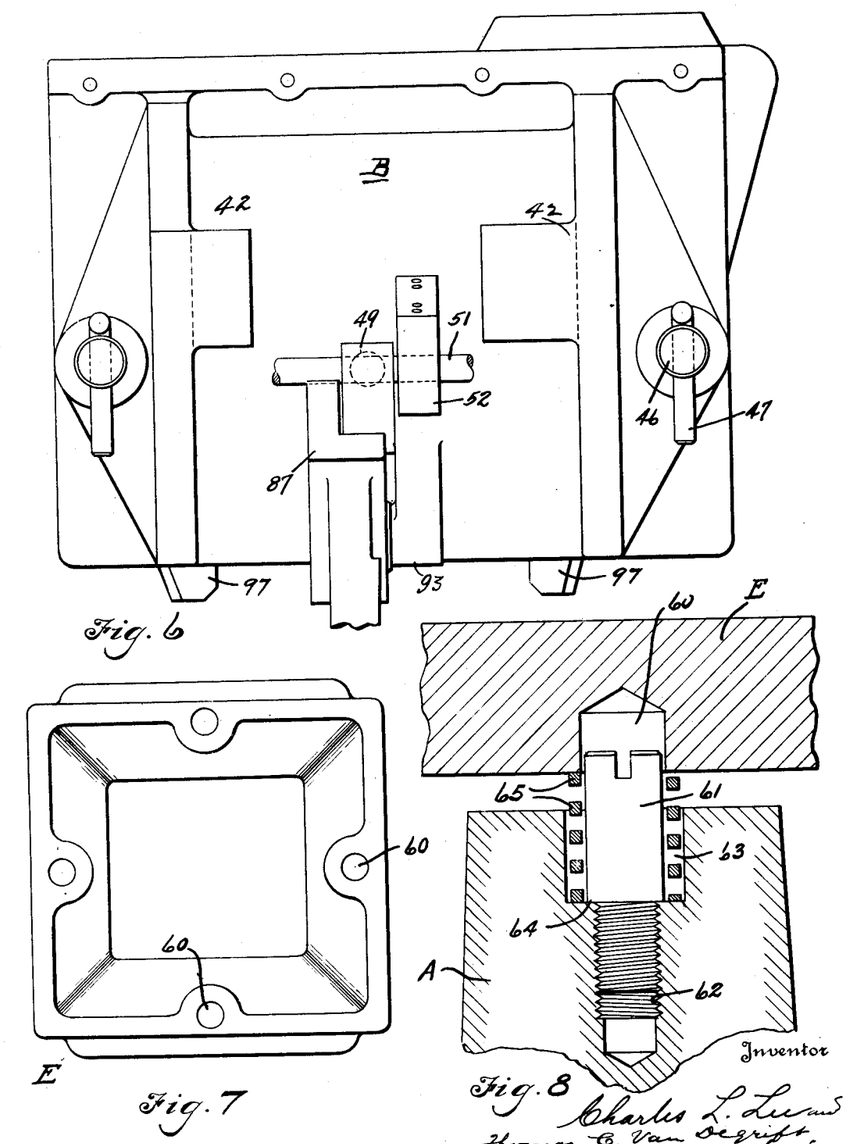
Fig. 6 is a view of the back of one of the mold section carriers, as viewed from the right-hand side of Figs. 2 and 3.
Fig. 7 is a bottom plan of a core platform.
Fig. 8 is a detail of one of the guides and yielding supports of the core platform.
Figure 9:
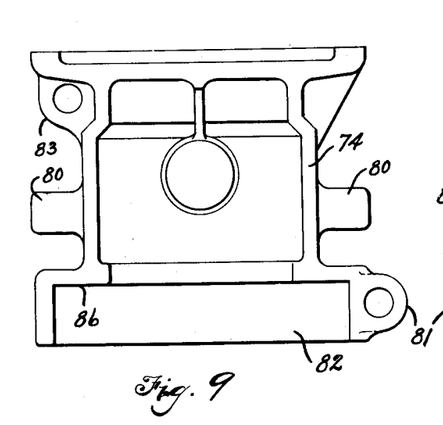
Fig. 9 is an elevation showing the inner side of one section of a piston core box.

In preparing for pouring a casting, the lever 28 is moved in a direction to open the mold sections which then occupy the position shown in dotted-lines in Fig. 1, and in full-lines in Figs. 4 and 5. In this position the molding surface of the molds may be sooted or otherwise coated readily. With the molds in this position, ready access can be had to the core platform. A core made as described in the core box F may be set on the surface 53 of the core platform E. No particular care to set the core accurately need be taken other than to see that no particles of sand lie between the surface 53 on the core platform and the bottom of the core base, and that the surface 68 is clean. The core may, of course, be coated at this time or previously if desired. The handle 28 may then be moved in a direction to close the mold. As the mold sections approach final closed position, the centering lugs will contact with the perimeter of the ring 71 of core-centering member 70, if the core is not in central position, and the core will thereby be moved to final position. The ledges 95 will also clamp down on the upper surface of ring 71 and hold the core true and firmly with the surface 68 forming the bottom of the mold. The mold is now ready to receive molten metal. When the casting has set, movement of handle 28 to open the mold sections moves them to the position illustrated in Figs. 4 and 5, having meantime operated ejector pins 49 to release the casting, should it stick to either of the sections.

While the embodiment disclosed herein, constitutes a preferred embodiment, it is understood that others might be adopted within the scope of the ensuing claims.

What is claimed is as follows:

1. In a casting apparatus a base; carriers for partible mold sections and means for effecting an opening and closing movement of one carrier with respect to another; said means comprising a link and lever mechanism so proportioned and arranged that when the mold sections are closed, said link and lever mechanism has the effect of locking them in closed position.

2. In a casting apparatus a base; carriers for partible mold sections and means for effecting an opening and closing movement of one carrier with respect to another, said means comprising a link and lever mechanism including a toggle, the members of which are approximately in line when the mold sections are closed.

3. In a casting apparatus a base; carriers for partible mold sections and means for effecting an opening and closing movement of one carrier with respect to the other; said means comprising a rock shaft journaled in said base; an arm rigid with said rock shaft; a mold-carrier lever pivoted to said base, and a mechanical connection between said arm on the rock shaft and said mold carrier lever so constructed and arranged that the line of force between said arm and said mold-carrier lever approximates a straight line extending from the axis of the rock shaft to the point of application of force to said mold-carrier lever when the mold sections are in closed position.

4. In a casting apparatus a base; carriers for partible mold sections and means for effecting an opening and closing movement of one carrier with respect to the other; said means comprising a rock shaft journaled in said base; an arm rigid with said rock shaft; a mold-carrier lever pivoted to said base; and a link pivoted to said arm and said mold-carrier lever, the said parts being so proportioned and disposed that when the mold sections are closed the axis of the rock shaft and the pivots of the link are nearly in a straight line.

5. In a casting apparatus a base; carriers for partible mold sections and means for effecting an opening and closing movement of one section with respect to another; said means comprising a mold-carrier lever fulcrumed on said base, a pivotal connection between said lever and said carrier; and means cooperating with the carrier during movement of the lever to open the mold sections that tilts the mold carrier.

6. In a casting apparatus a base; carriers for partible mold sections and means for effecting an opening and closing movement of one section with respect to another; and a cam mechanism operating by reason of the opening movement of the mold carrier to tilt said mold carrier.

7. In a casting apparatus a base; carriers for partible mold sections and means for effecting an opening and closing movement of one section with respect to another; a cam fixed to the base, and so disposed and formed as to engage the mold carrier and tilt it in the opening movement thereof.

8. In a casting apparatus a base; carriers for partible mold sections and means for effecting an opening and closing movement of one section with respect to another; a grooved cam fixed to the base and a stud on the mold carrier engaging the cam groove, the cam groove and stud being so disposed as to tilt the carrier during the opening movement and hold it in tilted position.

9. In a casting apparatus a base; carriers for partible mold sections and means for effecting an opening and closing movement of one section with respect to another; a cam mechanism operating by reason of the opening movement of the mold carrier to tilt said mold carrier and being so designed as to cause the mold carrier to approach and recede from its companion carrier in parallel during the final closing and initial opening movements.

10. In a casting apparatus, a carrier for a mold section having flanges, in combination with a mold section having side extensions fitting the faces of said flanges, said flanges and side extensions having registering openings; a headed pin adapted to pass freely into said openings and project at the back of a flange, and a slip key engaging the projecting end of said pin.

11. In a casting apparatus, a carrier for a mold section and a mold section secured to said carrier, means for spacing the back of the mold section from the carrier to provide a tubular space for the free passage of air between the mold section and the carrier.

12. In a casting apparatus, a carrier for a mold section having a channel bounded by flanges, a mold section having side extensions fitting the faces of said flanges and a body portion spaced from the carrier between said flanges so as to provide a passageway for air, and means for securing the mold section to the carrier.

13. In a casting apparatus, a carrier for a mold section; a mold section secured to said carrier, means for spacing the back of the mold section from the carrier to provide a tubular space for the free passage of air between the back of said mold section and said carrier, and radiating projections on the back of said mold section.

14. In a casting apparatus a base; mold sections and movable carriers therefor; means for actuating the carriers having a differential movement relative to said carriers; an ejector arranged to separate a casting from a mold section; connections between said ejector and said actuating means.

15. In a casting apparatus a base; mold sections and movable carriers therefor; means for actuating a carrier comprising a lever fulcrumed on the base and pivoted to the carrier; an ejector slidably mounted in registering holes in said carrier and the mold section carried by it; and a connection between the ejector and said lever.

16. In a casting apparatus a base; mold sections and movable carriers therefor; means for actuating a carrier comprising a lever fulcrumed on the base and pivoted to the carrier; an ejector slidably mounted in registering holes in said carrier and the mold section carried by it; and a connection between said ejector and said lever, comprising a transverse way in the ejector and a member rigid with the lever engaging said way.

17. In a casting apparatus a base; mold sections and movable carriers therefor; means for actuating a carrier comprising a lever fulcrumed on the base and pivoted to the carrier; an ejector slidably mounted in registering holes in said carrier and the mold section carried by it; and a connection between said ejector and said lever comprising a transverse open-ended way in the ejector and a pin on said lever engaging said open-ended way.

18. In a casting apparatus, the combination of a supporting base; a permanent mold having an open end; and a platform yieldingly mounted on said base opposed to the open end of the mold.

19. In a casting apparatus, the combination of a base; permanent mold sections having one end open; means for locking them unyieldingly in mating relation; and a platform yieldingly supported on said base opposed to said open end so as to yield to forces exerted by a solidifying casting in the mold.

20. In a casting apparatus, the combination of a base; a permanent mold; a platform yieldingly mounted on said base to cooperate with the mold; guides for maintaining the platform in position in one plane while permitting it to move perpendicularly to said plane; and elastic means sustaining said platform spaced from said base.

21. In a casting apparatus, the combination of a base member; a permanent mold; a platform member yieldingly mounted on said base to cooperate with the mold; guides for maintaining the platform in one position in one plane while permitting it to move perpendicularly thereto, said guides consisting of pins protruding from one member and entering guide sockets in the other; and coil springs encircling said pins.

22. In a casting apparatus a base; a core platform on said base; partible mold sections and carriers, and mechanism for moving said carriers to open and close said mold sections; and means engaging the base of a core resting on said platform and centering it with respect to the mold sections by the operation of moving the mold sections to closed position.

23. In a casting apparatus a base; a core platform on said base; partible mold sections and carriers, and mechanism for moving said carriers to open and close the mold sections; and depending lugs on said sections adapted to engage the base of a core resting on said platform and center it with respect to the mold sections as they move to closed position.

24. In a casting apparatus a base; a core platform thereon; partible mold sections and carriers, and mechanism for moving said carriers to open and close the mold sections; depending lugs on said sections adapted to engage the base of a core resting on said platform, and center it with respect to the mold sections; and a ledge on each section adapted to clamp the core to the platform when the mold sections are closed.

25. In a casting apparatus a base; a core platform thereon; a core having a flange-like base resting upon said platform; partible mold sections and carriers and mechanism for moving said carriers to open and close the mold sections; depending lugs on said sections adapted to engage the periphery of said flange-like base of the core and center it with respect to the mold sections, and a ledge on each section adapted to engage the upper surface of said flange-like base and clamp the core to said platform.

26. In a casting apparatus a base; a core platform thereon; a non-metallic core having a flange-like base resting upon said platform, said flange-like base having a metallic centering member having a rim; partible mold sections and carriers, and mechanism for moving said carriers to open and close the mold sections; depending lugs on said sections adapted to engage the periphery of said metallic rim and center the core with respect to the mold sections; and a ledge on each section adapted to engage the upper surface of said rim and clamp the core to said platform.

27. In a casting apparatus a base; a core platform thereon having ventilating grooves its surface, a non-metallic core resting on said platform, said core having a base comprising a metallic member having openings therethrough filled with core material; and a metallic mold cooperating with said core and platform.

28. In a casting apparatus, a base having a core-supporting platform provided with transverse grooves therein to permit the escape of gases from a core resting thereon; and a permanent mold with which said core cooperates.

In testimony whereof we hereto affix our signatures.

CHARLES L. LEE.
THOMAS C. VAN DEGRIFT.